United States Patent [19]
Tsuchiya et al.

[11] Patent Number: 5,624,474
[45] Date of Patent: Apr. 29, 1997

[54] OPTICAL FIBER PREFORM MANUFACTURING APPARATUS WHICH MEASURES A VERTICAL LOAD WITH THREE CELLS

[75] Inventors: Ichiro Tsuchiya; Hiroaki Ohta; Toshio Danzuka, all of Yokohama, Japan

[73] Assignee: Sumitomo Electric Industries, Ltd., Tokyo, Japan

[21] Appl. No.: 338,183

[22] Filed: Nov. 9, 1994

[30] Foreign Application Priority Data

Nov. 12, 1993 [JP] Japan .................... 5-283513

[51] Int. Cl.$^6$ .................................... C03B 37/07
[52] U.S. Cl. .................. 65/484; 65/486; 73/862.621; 73/862.627; 73/862.628; 73/788; 73/819
[58] Field of Search .................... 65/486, 484, 531, 65/491, 381, 377; 73/818, 819, 788, 862.621, 862.625, 862.627, 862.628

[56] References Cited

U.S. PATENT DOCUMENTS

| Re. 32,631 | 3/1988 | Layey ....................... 177/211 |
| 3,674,097 | 7/1972 | Gile ........................... 177/3 |
| 4,261,195 | 4/1981 | Lockery ...................... 73/1 B |
| 4,546,838 | 10/1985 | Ormond ................. 73/862.66 |
| 4,574,899 | 3/1986 | Griffin ..................... 177/211 |
| 4,684,384 | 8/1987 | Berkey ..................... 65/484 |
| 4,901,580 | 2/1990 | Potts ........................ 73/788 |
| 5,183,490 | 2/1993 | Mikami ..................... 65/144 |
| 5,425,278 | 6/1995 | Perkins ................. 73/862.632 |

FOREIGN PATENT DOCUMENTS

| 59-45936A | 3/1984 | Japan . |
| 63-151640 | 6/1988 | Japan ........................ 65/377 |
| 63-285130A | 11/1988 | Japan . |
| 3109230A | 5/1991 | Japan . |

OTHER PUBLICATIONS

Patent Abstracts of Japan, vol. 16, No. 304 (C–959) 6 Jul. 1992 & JP-A-04 083 727 (Hitachi Cable Co. Ltd.) 17 Mar. 1992.
Patent Abstracts of Japan, vol. 11, No. 30 (C–400) 29 Jan. 1987 & JP-A-61 201 638 (Sumitomo Electric Industries Co. Ltd.) 6 Sep. 1986.

*Primary Examiner*—John Hoffmann
*Attorney, Agent, or Firm*—Watson Cole Stevens Davis, P.L.L.C.

[57] ABSTRACT

An optical fiber preform manufacturing apparatus which continuously monitors the weight of a preform during manufacturing by a load cell without increasing the offset amount of the preform. The preform manufacturing apparatus includes a rotary chuck unit vertically moved by an elevating unit and a rod gripped by the rotary chuck unit and vertically extending downward. At the time of manufacturing a preform, the elevating unit and the rotary chuck unit are driven to rotate and move a starting rod suspended from the lower end of the rod upward. A support plate is fixed to the rotary chuck unit. Three or more load cells are arranged between the support plate and an elevating plate of the elevating unit. The rotary chuck unit is firmly supported by these load cells, so that the rotating shaft is not inclined. A hole is formed in the elevating plate, and the rotary chuck unit extends through the hole with a gap therebetween. A load by the support plate, the rotary chuck unit, the seed rod, a starting rod and the preform acts on the load cells. Therefore, the weight of the preform can be detected from an output from the load cells.

10 Claims, 8 Drawing Sheets

OPTICAL FIBER PREFORM MANUFACTURING APPARATUS WHICH MEASURES A VERTICAL LOAD WITH THREE CELLS

BACKGROUND OF THE INVENTION

1. Field of the Invention

The present invention relates to an apparatus and method of manufacturing an optical fiber preform and, more particularly, to a means for detecting the weight of a rotatably supported preform during rotation of the preform.

2. Related Background Art

As a conventional method of manufacturing an optical fiber preform, a VAD (Vapor Axial Deposition) method or an OVD (Outside Vapor Deposition) method is generally known. In the VAD or OVD method, fuel gases such as $H_2$ and $O_2$ and material gases such as $SiCl_4$ and $GeCl_4$ are supplied to a burner in a reaction vessel, and these gases are burned to generate fine particles of $SiO_2$ and $GeO_2$. Then, the fine glass particles are deposited on a rotating target.

A target used in the VAD method is a preform itself grown from the distal end of a starting rod. In the OVD method, a preform grown on a core rod and in the periphery thereof is used as a target. In the VAD method, the preform is gradually fed in the axial direction to grow the preform in the axial direction. The OVD method is different from the VAD method in that the preform and the burner are relatively moved to grow the preform in the radial direction. In the VAD method, normally, the preform is vertically arranged, and the starting rod is vertically pulled upward, thereby growing the preform. Also in the OVD method, the preform is sometimes grown in a vertically arranged state.

In the VAD or OVD method, normally, the growth state of the preform is continuously monitored and fed back to parameters for changing the growth rate, e.g., the flow rates of the fuel and source gases supplied to the burner, the pull-up speed of the preform, and the exhaust rate of the reaction vessel.

As a method of monitoring the growth rate of a preform, a preform growth point monitor by a laser is normally used. However, a method of monitoring the weight of a preform is disclosed in Japanese Patent Laid Open No. 59-45936.

Figure 1:
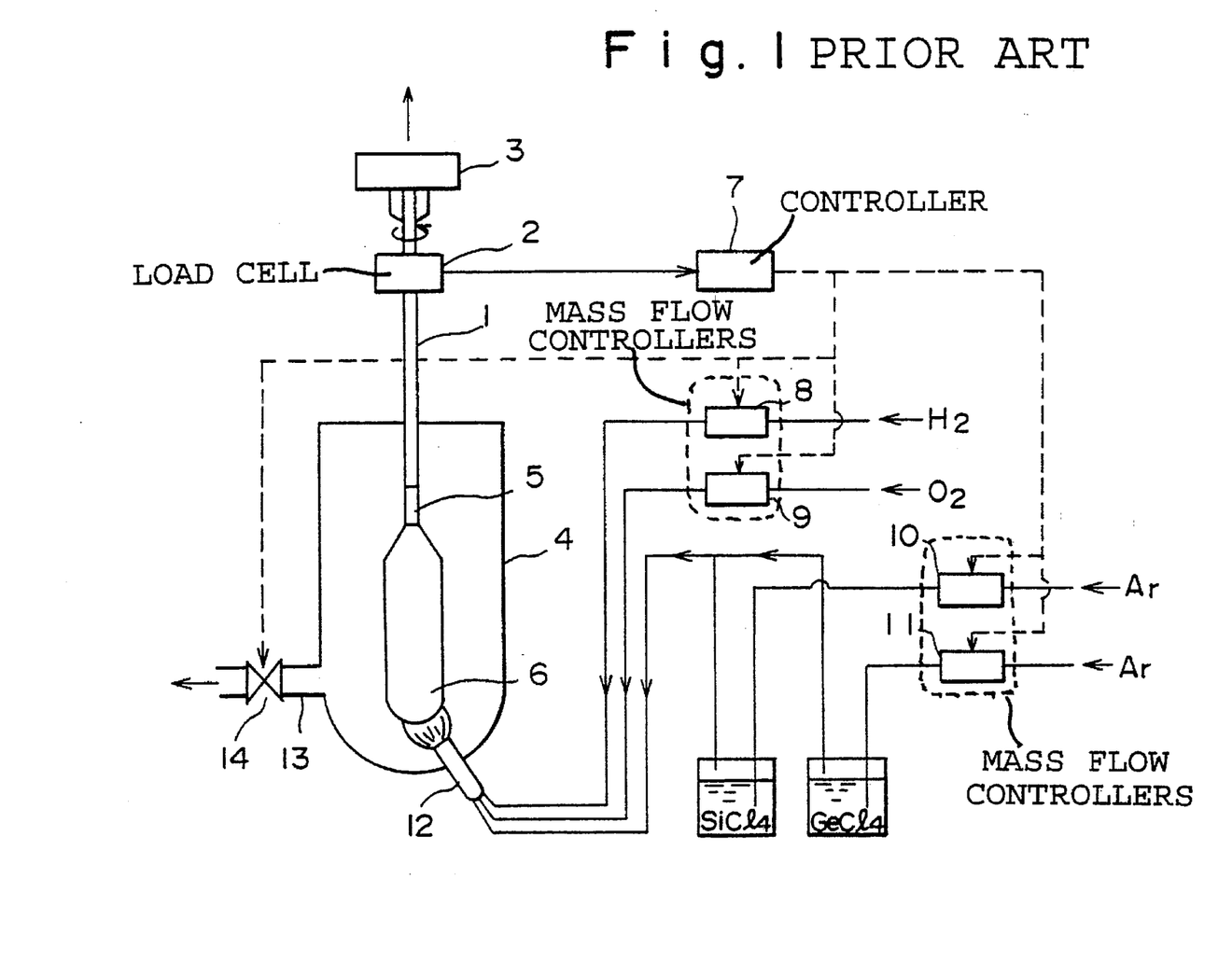
FIG. 1 is a view schematically showing a conventional optical fiber preform manufacturing apparatus.

FIG. 1 is a view showing a conventional apparatus for manufacturing an optical fiber preform as disclosed in Japanese Patent Laid Open No. 59-45936. The apparatus shown in FIG. 1 uses the VAD method to manufacture a preform and can monitor the weight of the preform. In this apparatus, a seed rod 1 is supported by a chuck 3 through a load cell 2. The lower portion of the seed rod 1 extends into a reaction vessel 4. In the reaction vessel 4, the upper end of a starting rod 5 is connected to the lower end of the seed rod 1. A preform 6 is grown from the lower end of the starting rod 5 in the vertical direction, i.e., in the axial direction of the starting rod 5. The load cell 2 is used to measure the weight of the preform 6.

The chuck 3 is attached to an elevating unit (not shown) and can be vertically moved. The chuck 3 is rotatably supported and connected to a motor (not shown). Therefore, the seed rod 1, the load cell 2, the starting rod 5, and the preform 6, all of which are suspended from the chuck 3, can be rotated and vertically moved. The load cell 2 outputs a signal corresponding to the weight of the growing preform 6 to a controller 7. The controller 7 sends the signal representing the weight of the preform to mass flow controllers 8 to 11, thereby adjusting the flow rates of $H_2$ and $O_2$ to a burner 12, and at the same time adjusting the flow rate of Ar as a carrier gas for bubbling $SiCl_4$ and $GeCl_4$ gases, i.e., adjusting the flow rates of the $SiCl_4$ and $GeCl_4$ gases to the burner 12. The controller 7 can also adjust the degree of opening of an exhaust valve 14 provided in an exhaust pipe 13 of the reaction vessel 4, thereby adjusting the exhaust amount.

In the above-described conventional preform manufacturing apparatus, the growth state of the preform 6 can be continuously monitored by detecting the weight of the preform by the load cell 2. However, the flexural rigidity of the load cell 2, i.e., the rigidity against a force in the radial direction, is relatively low. For this reason, in the above arrangement in which the load cell 2 is rotated together with the seed rod 1 and the preform 6, the distal end of the preform 6 tends to offset from the original rotation axis of the seed rod 1 during rotation.

Since the normal growth rate of the preform 6 is several grams per minute, sensitivity of the load cell adapted for this order is required. To realize this sensitivity, the sensor portion of the load cell 2 must have a low flexural rigidity to detect a very small amount. Additionally, to prevent a measurement error due to friction, the seed rod 1 cannot be restrained in the radial direction. Therefore, the above-described conventional apparatus has a structure easily affected by offset of the preform 6. Offset of the preform 6 causes an eccentric growth. As a result, when an optical fiber is finally manufactured from such a preform, the optical fiber core may undesirably become eccentric, or non-circularity of the fiber is generated.

In addition, in the above-described apparatus, a signal from the load cell 2 must be extracted using a slip ring (not shown) serving as a movable contact. This tends to cause noise inclusion in the signal.

SUMMARY OF THE INVENTION

It is an object of the present invention to provide a preform manufacturing apparatus and method capable of detecting the weight of a preform during rotation of the preform without offset of the preform.

It is another object of the present invention to provide a preform manufacturing apparatus and method capable of preventing noise inclusion in the detection signal of the weight of a preform.

These objects are achieved by the present invention. One aspect of the present invention is directed to an optical fiber preform manufacturing apparatus for manufacturing an optical fiber, preform by depositing fine glass particles on a starting rod or a core rod which is connected to one end of a seed rod and rotated with the seed rod. The optical fiber preform manufacturing apparatus comprises: an elevating unit having an elevating member which can be vertically moved; a rotary support unit for gripping the other end of the seed rod to suspend and support the seed rod vertically and for rotating the seed rod about the longitudinal axis of the seed rod; and a load cell disposed between a surface of the rotary support unit and a surface of the elevating member, the surfaces being vertically spaced relative to each other, for supporting the rotary support unit and for detecting a load vertically applied thereto.

According to a second aspect of the present invention, an optical fiber preform manufacturing method comprises the steps of: providing an optical fiber preform manufacturing apparatus includes an elevating unit having an elevating member which can be vertically moved, a rotary support unit for gripping the other end of the seed rod to suspend and support the seed rod vertically and for rotating the seed rod about the longitudinal axis of the seed rod, a load cell disposed between a surface of the rotary support unit and a surface of the elevating member, the surfaces being vertically spaced to each other, for supporting the rotary support unit and for detecting a load vertically applied thereto, and a measurement device for measuring the weight of the preform on the basis of an output signal from the load cell; continuously monitoring the weight of the preform measured by the measurement device of the optical fiber preform manufacturing apparatus; and controlling the growth of the preform according to the monitoring result.

Further, the present invention relates to a rotary support apparatus which comprises: a base; a rotary support unit for suspending and supporting an object vertically and for rotating the suspended object; and a load cell disposed between a surface of the rotary support unit and a surface of the elevating member, the surfaces being vertically spaced from each other, for supporting the rotary support unit and for detecting a load vertically applied thereto.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

A preferred embodiment of the present invention will be described below in detail with reference to the accompanying drawings.

Figure 2:
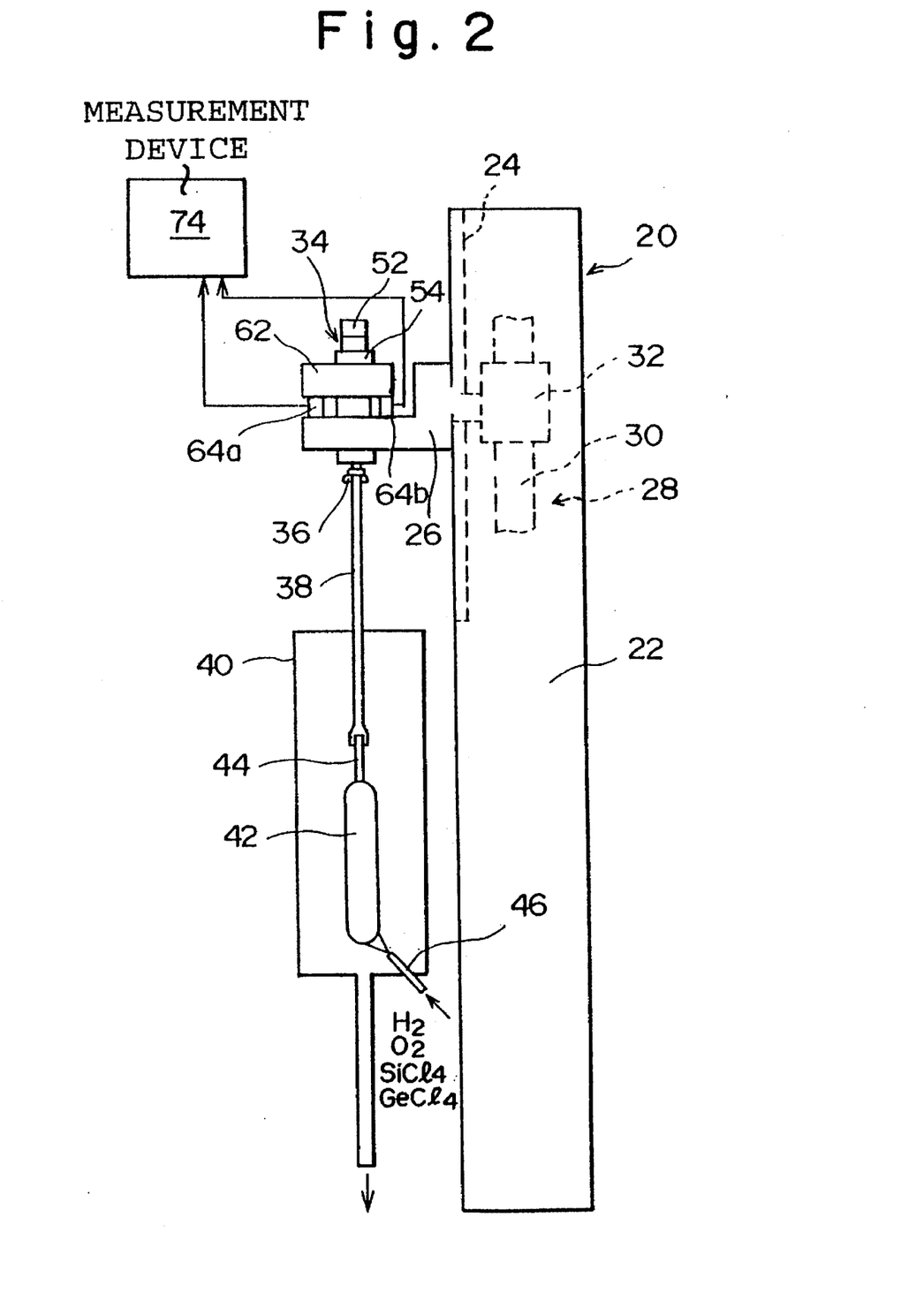
FIG. 2 is a view schematically showing an optical fiber preform manufacturing apparatus according to the present invention.

FIG. 2 is a view schematically showing an optical fiber preform manufacturing apparatus which is manufacturing a preform by a VAD method. Referring to FIG. 2, reference numeral 20 designates an elevating unit. The elevating unit 20 has a frame 22 almost vertically arranged and an elevating plate 26 provided on the frame 22. The elevating plate 26 can be vertically moved along a guide 24 in the frame 22. The elevating unit 20 also has a driving mechanism 28 for vertically moving the elevating plate 26. As the driving mechanism 28, a ball screw mechanism consisting of a feed screw 30 vertically disposed in the frame 22 and rotated by a motor (not shown) and an internal thread member 32 threadably engaged with the feed screw 30 is preferably used. The elevating plate 26 is attached to the internal thread member 32.

The elevating plate 26 of the elevating unit 20 horizontally extends. A rotary chuck unit or rotary support unit 34 is provided at a distal end portion of the plate 26. The rotary chuck unit 34 includes a grip mechanism or chuck 36 projecting downward from the lower portion of the unit 34. The chuck 36 is used to grip and suspend a rod 38. The suspended rod 38 vertically extends downward into a reaction vessel 40. In the reaction vessel 40, the lower end of the rod 38 is connected to the upper end of a starting rod 44 serving as a starting point of growth of a preform 42. Therefore, the starting rod 44 is suspended by the rod 38 and vertically arranged in the reaction vessel 40, as shown in FIG. 2.

An oxy-hydrogen burner 46 is provided in the reaction vessel 40. The oxy-hydrogen burner 46 sprays fine glass particles, e.g., fine glass particles of $SiO_2$, $GeO_2$, in a gaseous phase to the lower end of the suspended starting rod 44. Oxygen and hydrogen serving as fuel gases and material gases such as $SiCl_4$ and $GeCl_4$ are supplied to the oxy-hydrogen burner 46. These gases are mixed and burned in the burner 46 to generate the fine glass particles while the fine glass particles are sprayed from the burner 46, the rod 38 and the starting rod 44 are rotated about their longitudinal axis and at the same time vertically pulled up by driving the rotary chuck unit 34 and the elevating unit 20. Therefore, first of all, the fine glass particles are deposited on the lower end of the starting rod 44, and thereafter, the preform 42 is continuously grown in the axial direction.

Figure 3:
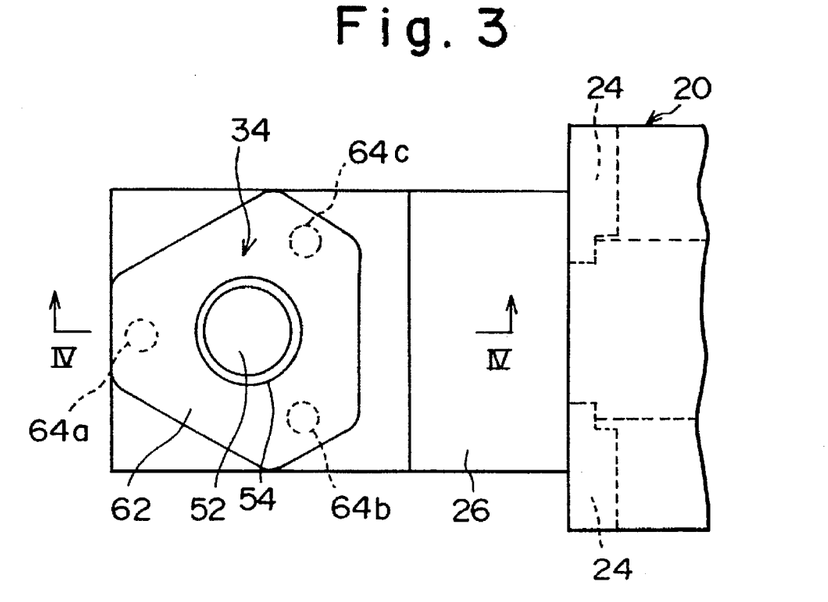
FIG. 3 is an enlarged plan view showing a rotary chuck unit and an elevating plate in the manufacturing apparatus in FIG. 2.
Figure 4:
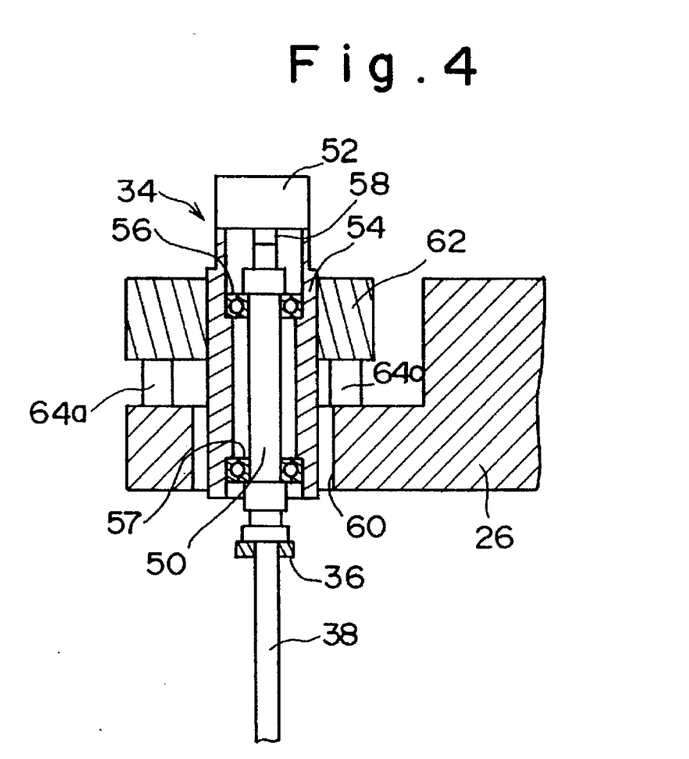
FIG. 4 is a sectional view taken along a line IV—IV in FIG. 3.

FIG. 3 is an enlarged plan view showing the elevating plate 26 of the elevating unit 20 and the rotary chuck unit 34. FIG. 4 is a sectional view taken along a line IV—IV in FIG. 3. As shown in FIG. 4, the rotary chuck unit 34 includes a rotating shaft 50 having the chuck 36 at one end thereof (lower end in FIG. 4), a motor 52 attached to the other end of the rotating shaft 50, and a cylindrical housing 54 coaxially surrounding the rotating shaft 50. At least one bearing (bearings 56 and 57) is arranged in an annular space between the housing 54 and the rotating shaft 50 so as to rotatably support the rotating shaft 50 in the housing 54. As shown in FIG. 4, it is preferable to mount a pair of angular ball bearings 56 and 57 between the housing 54 and the rotating shaft 50, thereby only rotating the rotating shaft 50 while preventing its axial movement. The motor 52 is fixed at the upper end of the housing 54. An output shaft 58 of the motor 52 is connected to the rotating shaft 50 in the housing 54. It is preferable that the motor 52 incorporates a reduction mechanism (not shown) and can stably rotate the output shaft 58 at a relatively low rotational speed, e.g., 40 rpm.

A circular hole 60 is formed through the distal end portion of the elevating plate 26 of the elevating unit 20. The lower portion of the housing 54 of the rotary chuck unit 34 is arranged in the hole 60 such that a predetermined gap is set therebetween. Although not illustrated, a U-shaped groove having one end opening to the edge portion of the elevating plate 26 may be formed in place of the hole 60, and the housing 54 may be arranged in the U-shaped groove.

A support plate 62 is fixed around the upper outer surface of the housing 54 of the rotary chuck unit 34 and extends outward in the radial direction which is normal to the longitudinal axis of the housing 54. As shown in FIG. 3, the support plate 62 has a hexagonal shape obtained upon cutting off the vertex portions of a substantial regular triangular plate. The central axis of the rotating shaft 50 of the rotary chuck unit 43 vertically extends through the center of gravity of the support plate 62. Three load cells 64a, 64b and 64c which have almost the same shape are arranged between the elevating plate 26 and portions near the short sides of the support plate 62, respectively. It is preferable that the three load cells 64a, 64b and 64c form a substantial regular triangle upon connecting the central points of the upper end surfaces thereof to each other, and at the same time, the central axis of the rotating shaft 50 extends through the center of gravity of the substantial regular triangle. The central axes of the load cells 64a, 64b and 64c extend in the vertical direction. The upper ends of the load cells 64a, 64b and 64c are fixed on the lower surface of the support plate 62 while the lower ends are fixed on the upper surface of the elevating plate 26. The load cells 64a, 64b and 64c are arranged around the hole 60 of the elevating plate 26 at positions separated from the central point of the hole 60 by a predetermined distance. The lower surface of the support plate 62 extends perpendicular to the central axis of the rotating shaft 50 while the upper surface of the elevating plate 26 horizontally extends. With this arrangement, the housing 54 and the rotating shaft 50 of the rotary chuck unit 34 are directed in the vertical direction, and the housing 54 is arranged in the hole 60 of the elevating plate 26 such that an annular gap is formed therebetween.

Figure 5:
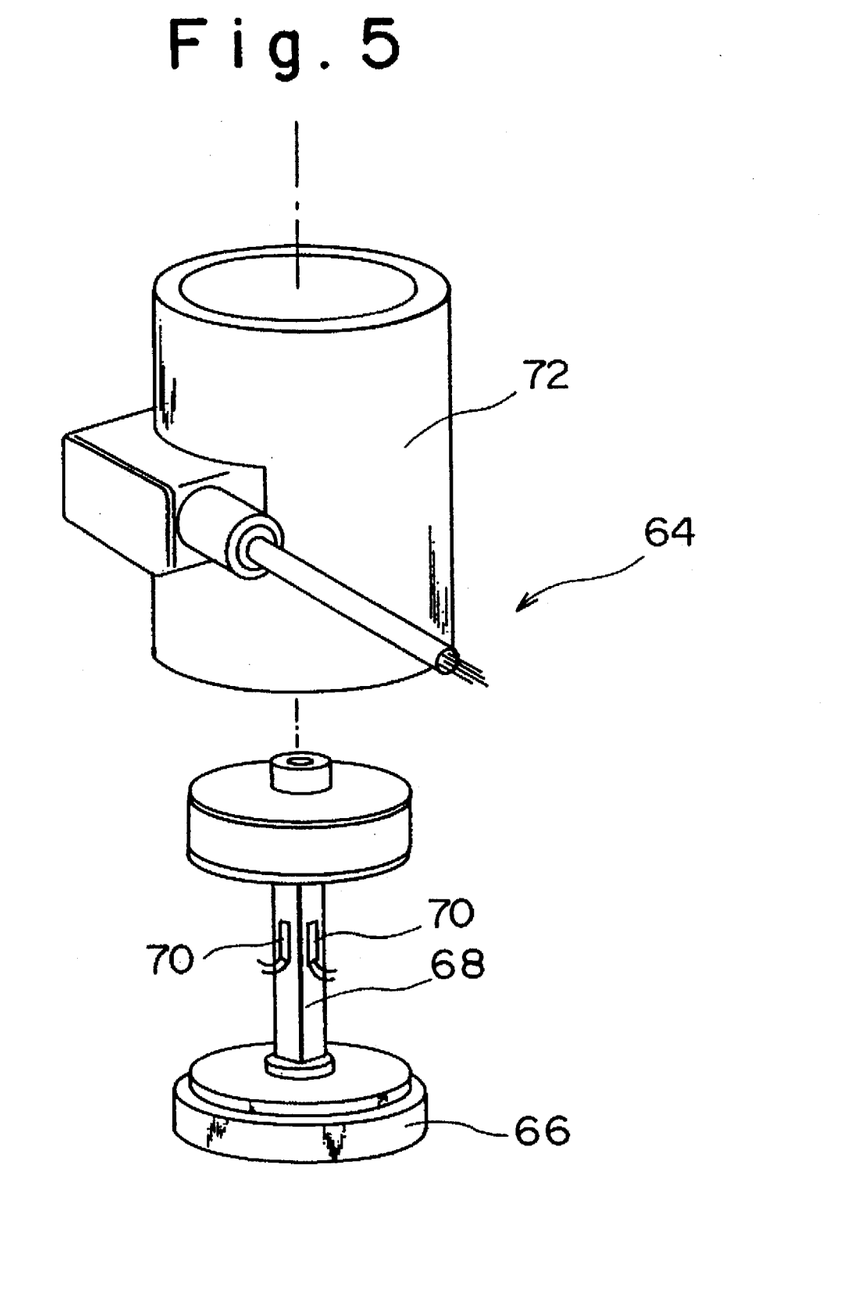
FIG. 5 is an exploded perspective view showing an example of a load cell which can be used in the present invention.

FIG. 5 is an exploded perspective view of a load cell 64. The load cell 64 used in this embodiment is of a conventionally known strain gauge type. The load cell 64 is basically constituted by a rigid rod or a strain generating rod 68 serving as a sensor portion standing on a base 66, strain gauges 70 bonded on the surface of the strain generating rod 68, which are preferably foil strain gauges of a self-temperature compensation type, and a cover 72 surrounding the strain gauges 70 to protect them from the external environment. In this embodiment, the strain generating rod 68 is a quadrangular prism, and the four strain gauges 70 are respectively fixed on the side surfaces of this prism. When a compressive force is applied on the strain generating rod 68 in the axial direction, each of the strain gauges 70 converts a strain generated on the surface of the strain generating rod 68 into an electrical signal. The strain gauges 70 on the strain generating rod 68 form a bridge such that the sum of the electrical signals from the strain gauges 70 is output as an output signal.

In this embodiment, the support plate 62 is fixed at the upper end of the strain generating rod 68 of the load cell 64 by bolts or the like (not shown) while the base 66 is fixed to the elevating plate 26 by bolts or the like (not shown). In this case, a compressive load corresponding to about ⅓ the total weight of the preform 42, the starting rod 44, the rod 38, the rotary chuck unit 34, and the support plate 62 acts on the strain generating rod 68 of each of the load cells 64a, 64b and 64c. At this time, the housing 54 of the rotary chuck unit 34 extending through the hole 60 of the elevating plate 26 is not in contact with the elevating plate 26, so a resistance caused due to contact between the housing 54 and the elevating plate 26 does not act on the load cells 64a, 64b and 64c. Hence, the sum of signals output from the three load cells 64a, 64b and 64c corresponds to the total weight of the preform 42, the starting rod 44, the rod 38, the rotary chuck unit 34 and the support plate 62. The weight of the rod 38, the rotary chuck unit 34 and the support plate 62 does not change. For this reason, the weight of the preform 42 and the starting rod 44 can be measured from the sum of the output signals from the load cells 64a, 64b and 64c. Therefore, when an appropriate measurement device 74 is connected to the load cells 64a, 64b and 64c, the weight of the preform 42 and the starting rod 44 can be automatically measured.

Figure 6:
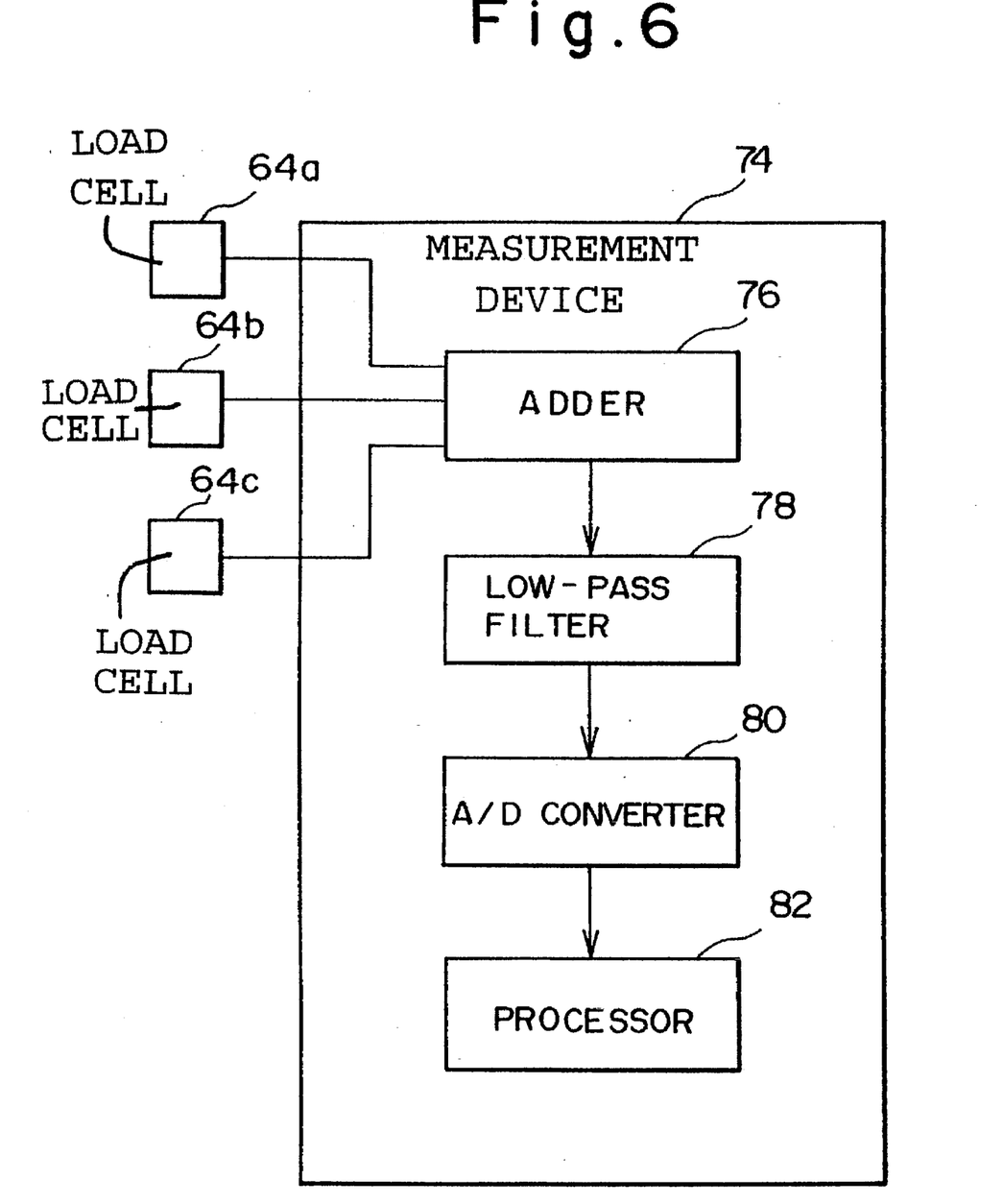
FIG. 6 is a block diagram schematically showing the arrangement of a measurement device applicable to the manufacturing apparatus of the present invention.

FIG. 6 is a block diagram showing an example of the measurement device 74 connected to the three load cells 64a, 64b, and 64c. The measurement device 74 mainly comprises an adder section 76 for adding output signals from the load cells 64a, 64b, and 64c, a low-pass filter section 78 for removing high-frequency components from a sum signal from the adder section 76, an A/D converter section 80 for digitizing the signal passing through the low-pass filter 78, and a processor section 82 for processing the digital signal from the A/D converter 80 to obtain the weight of the preform 42 and the starting rod 44. The weight of the preform 42 and the starting rod 44, which is obtained by the processor section 82, is preferably displayed by a display unit (not shown).

Figure 7:
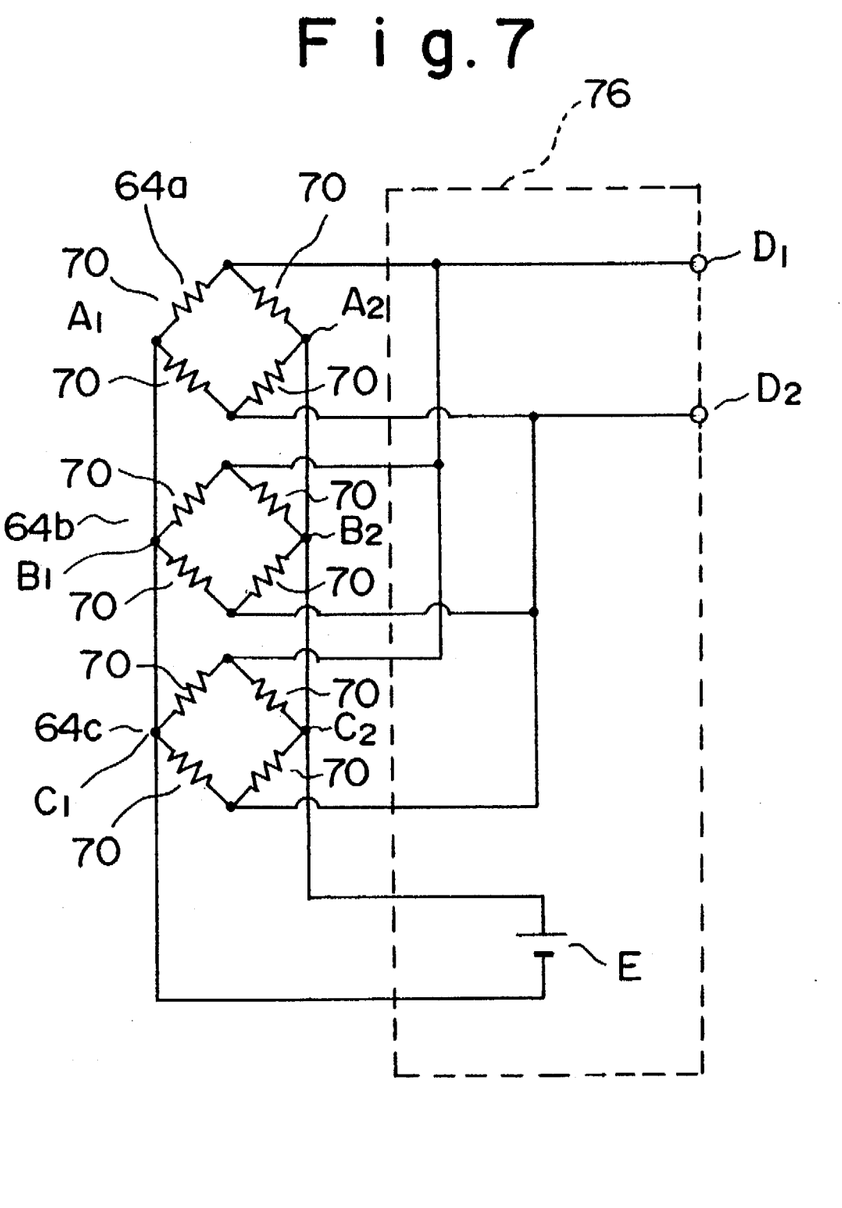
FIG. 7 is a circuit diagram showing an example of a circuit of an adder section in the measurement device.

Although circuits of various types are available as the adder section 76 in the measurement device 74, a parallel adding circuit in which the inputs and outputs of the load cells 64a, 64b, and 64c are parallelly connected with each other, as shown in FIG. 7, is preferably used. This circuit is well known. A common power supply E is connected to terminals $A_1$ and $A_2$; $B_1$ and $B_2$; and $C_1$ and $C_2$ of the block circuit of the strain gauges 70 in the three load cells 64a, 64b, and 64c. With this arrangement, a signal obtained upon adding outputs from the load cells 64a, 64b, and 64c is output from output terminals $D_1$ and $D_2$ of the adder section 76.

The low-pass filter section 78 removes high-frequency components in a frequency range of 2 Hz and more, and preferably 0.5 Hz and more, from the added signal. With this operation, noise caused due to vibrations of the motor 52 and other noise can be removed from the added signal.

With this arrangement, fine glass particles sprayed from the burner 46 are deposited on the lower end of the starting rod 44, thereby continuously growing the preform 42. In this case, as described above, the motor 52 of the rotary chuck unit 34 is driven to rotate the rod 38 and the starting rod 44. At the same time, the elevating unit 20 is driven to move the elevating plate 26 upward, thereby pulling up the starting rod 44. Even during this operation, only a compressive load corresponding to the total weight of the preform 42, the starting rod 44, the rod 38, the rotary chuck unit 34, and the support plate 62 substantially acts on the load cells 64a, 64b and 64c. Therefore, the weight of the preform 42 and the starting rod 44 can be accurately obtained by the measurement device 74.

The support plate 62 horizontally extending from the rotary chuck unit 34 is supported at three points by the upper ends of the strain generating rod 68 of the load cells 64a, 64b and 64c, to which a load is uniformly applied. Additionally, the strain generating rod 68 of each of the load cells 64a, 64b and 64c has a deformation amount in the axial direction on the order of only 10 μm. Therefore, the support plate 62 rarely changes its posture. For this reason, the axes of the housing 54 and the rotating shaft 50 of the rotary chuck unit 34, and the axis of the rod 38 are always kept arranged in the vertical direction. As a result, during manufacturing the preform, offset of the lower end of the starting rod 44 or the preform 42 connected to the lower end of the rod 38 can be prevented. Therefore, the preform 42 manufactured in this manner has high quality. When an optical fiber is manufactured from this preform 42, a high-quality optical fiber can be obtained without eccentricity of the core or non-circularity of the fiber.

Although the load cells 64a, 64b and 64c are vertically moved together with the elevating plate 26 of the elevating unit 20, they are not rotated. For this reason, no slip ring serving as a movable contact is required to extract an output signal, so noise by the slip ring is not generated at all.

When the weight of the preform and the starting rod, which is measured by the measurement device 74, is monitored, the growth state of the preform 42 can be estimated. On the basis of the estimated growth state of the preform 42, the raising speed of the elevating plate 26 of the elevating unit 20 (i.e., the pull-up speed of the starting rod 44), the flow rates of the fuel gases and the material gases, the exhaust amount of the reaction vessel 40, and the like can be adjusted, so that the preform 42 with higher quality can be manufactured. Therefore, as in the conventional apparatus shown in FIG. 1, measurement data from the measurement device 74 is continuously sent to a controller, and a deviation in the amount of increase in weight is obtained every predetermined period of time. Feedback to the pull-up speed of the preform 42 is performed in accordance with the deviation, thereby effectively controlling the amount of increase in weight of the preform 42. Additionally, feedback to other parameters such as the flow rates of the fuel gases or the material gases supplied to the burner 46 and the exhaust amount of the reaction vessel 40, which affect the growth rate, can also be performed.

In the above-described preform manufacturing apparatus, various weights (500 g to 5 kg) were suspended from the lower end of the rod 38, and the motor 52 of the rotary chuck unit 34 was driven. In this state, the weight of each weight was actually measured. At this time, as the load cells 64a, 64b and 64c, load cells each capable of measuring a weight of 10 kg at maximum were used, and a weight with no weight was calibrated to an initial value of zero. The rotational speed of the rotating shaft 50 of the rotary chuck unit 34 was set to 40 rpm, and the threshold value of the low-pass filter 78 in the measurement device 74 was set to 2 Hz. A/D conversion was performed at a rate of 10 times/second, and a moving average of the weights measured 32 times was calculated.

When measurement was performed under these conditions, the stability of the weight measurement was within a range of ±10 g. Considering that the repetition error of the used load cells is 0.1% or less, this measurement result can be regarded to be sufficiently accurate and stable.

Figure 8:
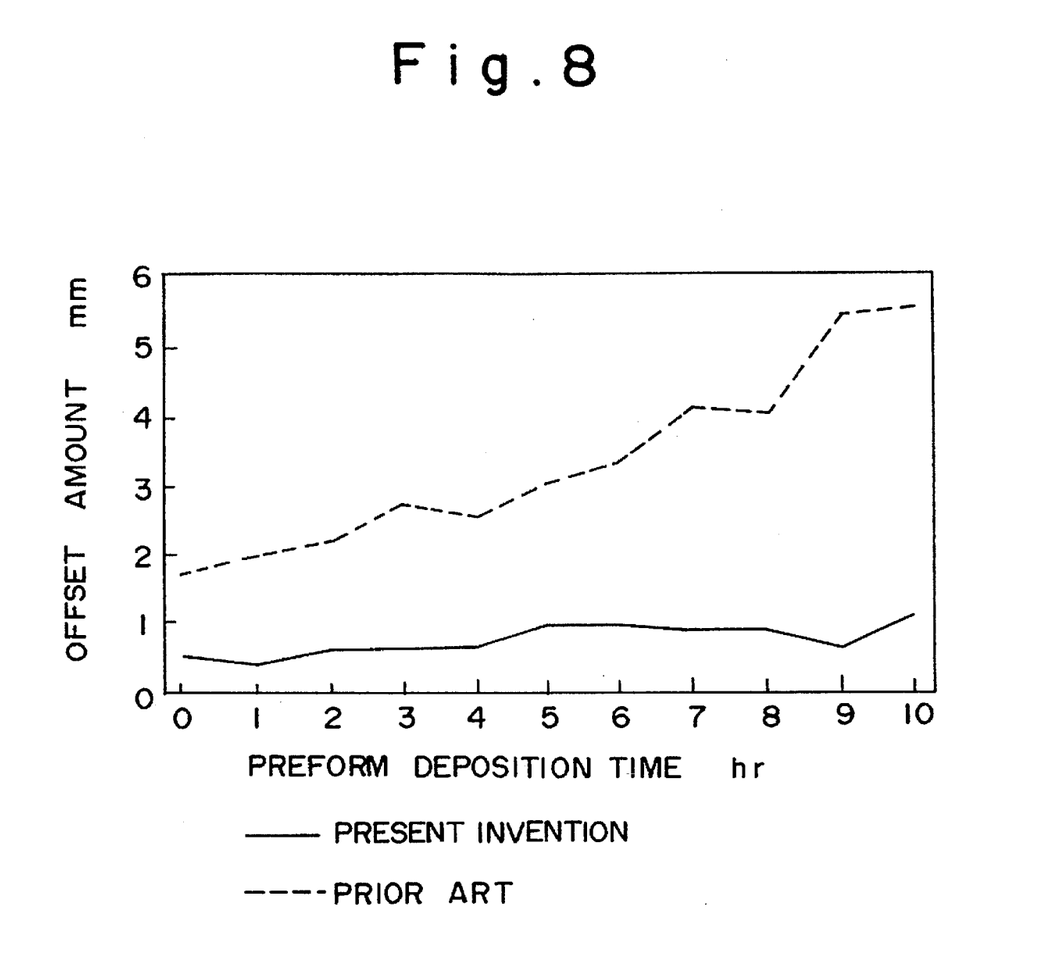
FIG. 8 is a graph showing comparison between the offset amount of a preform in the apparatus according to the present invention and that in the conventional apparatus.
Figure 9:
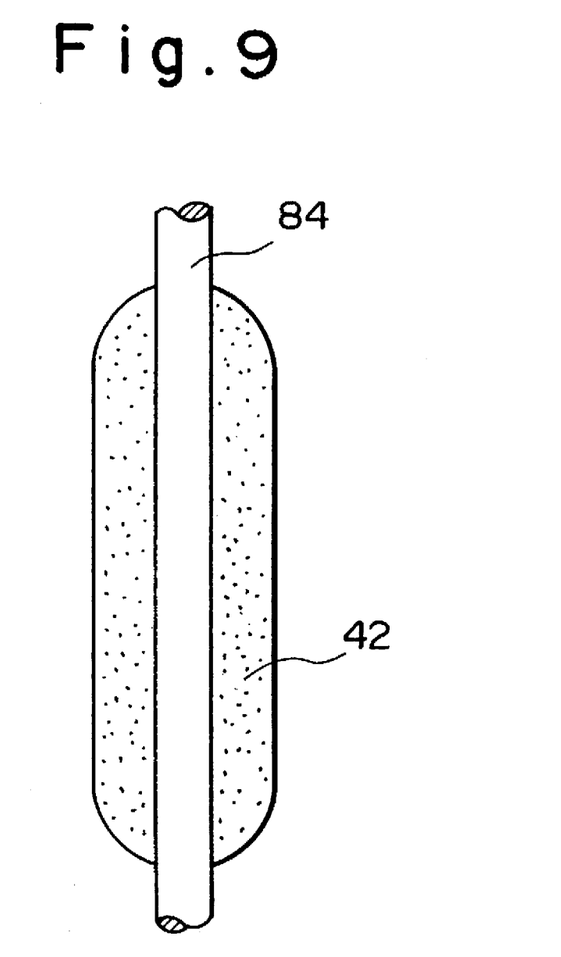
FIG. 9 is a sectional view showing a preform manufactured by an outside deposition method.

FIG. 8 is a graph showing a change in offset amount of the preform 42 immediately under the growth point, which was measured by using the apparatus according to the present invention and the conventional apparatus as shown in FIG. 1 while the preform was actually manufactured. In this case, the abovementioned axial deposition method was not used, and the VAD, outside deposition method was used in which fine glass particles were deposited around a core rod 84 to grow the preform 42, as shown in FIG. 9. The arrangement of this apparatus and the preform manufacturing procedures are the same as those of the above-described apparatus except that the upper end of the core rod 84 is connected to the lower end of the rod 38.

As is apparent from FIG. 8, in the conventional apparatus, the offset amount of the preform was large in the beginning, and the offset amount exceeded 5 mm at the end of manufacturing of the preform. To the contrary, in the apparatus according to this embodiment, the offset amount of the preform was 1.0 mm or less during manufacturing from the beginning to the end. The reason why such a satisfactory result is obtained is that the rotary chuck unit 34 is firmly supported by the three load cells 64a, 64b and 64c and no load cell is interposed between the rod 38 and the chuck 36.

The preferred embodiment of the present invention has been described above. However, the present invention is not limited to the above embodiment, as a matter of course. For example, although the three load cells are used in the above embodiment, four or more load cells can also be used. In this case, it is preferable that the load cells are arranged at an equal angular interval on a circle formed about a certain central point, and the rotating shaft of the rotary chuck unit is set on the central point.

In the above embodiment, the output shaft of the motor of the rotary chuck unit is directly connected to the rotating shaft. However, the motor can be arranged on the support plate, and the output shaft of the motor can be coupled to the rotating shaft through a transmission mechanism such as a belt (not shown).

As described above, the manufacturing apparatus of the present invention can be applied to not only the VAD method but also the outside vapor phase deposition method such as the OVD method in which the preform is grown on a core rod.

In the above embodiment, the load cells as a unit are used. However, in place of these load cells, a rod-like member can be arranged between the elevating plate and the support plate, and at least one strain gauge can be attached on the rod-like member.

As has been described above, according to the present invention, the weight of the preform can be continuously monitored using the load cells without increasing the offset amount of the preform. Therefore, an abnormal growth of the preform can be detected to correct the preform growth conditions or stop the growth of the preform, thereby preventing production of a defective preform. In addition, a high-quality preform can be manufactured by the preform offset preventing effect without eccentricity of the core or non-circularity of a fiber. Furthermore, in the present invention, the load cells are not rotated. For this reason, no slip ring for extracting a signal is required, thereby preventing noise inclusion.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 5-283513 filed on Nov. 12, 1993 is hereby incorporated by reference.

What is claimed is:

1. An optical fiber preform manufacturing apparatus for manufacturing an optical fiber preform by depositing fine glass particles on a first rod, said first rod being connected to a first end of a second rod and rotated with the second rod, said optical fiber preform manufacturing apparatus comprising:

an elevating unit having an elevating member and means for vertically moving the elevating member, the elevating member having a first surface;

a rotary support unit for gripping a second end of the second rod to suspend and support the second rod vertically and for rotating the second rod about a longitudinal axis of the second rod, the rotary support unit having a second surface which is vertically spaced from the first surface; and at least three load cells disposed between the first surface and the second surface for supporting said rotary support unit and for determining a load vertically applied to the rotary support unit.

2. An optical fiber preform manufacturing apparatus according to claim 1, wherein the rotary support unit comprises a support plate which extends horizontally and which is disposed above the elevating member, and wherein each of said load cells is disposed between said support plate and said elevating member.

3. An optical fiber preform manufacturing apparatus according to claim 1, wherein said rotary support unit includes a rotating shaft with a first and a second end, a gripper or chuck provided at the first end of said rotating shaft to grip the second rod, a driver connected to the second end of said rotating shaft to rotate said rotating shaft, a cylindrical housing surrounding said rotating shaft, and a bearing disposed in an annular space between said rotating shaft and said housing for rotatably supporting said rotating shaft, and wherein said rotary support unit is disposed such that said rotating shaft is disposed vertically.

4. An optical fiber preform manufacturing apparatus according to claim 3, wherein said elevating member has a passage into which said housing of said rotary support unit is inserted with a gap between the housing and a wall of the passage.

5. An optical fiber preform manufacturing apparatus according to claim 1, further comprising a measurement device for measuring a weight of said first and second rods by operating on output signals from said at least three load cells.

6. An optical fiber preform manufacturing apparatus according to claim 5, wherein said measurement device includes an adder for adding the output signals from said at least three load cells.

7. An optical fiber preform manufacturing apparatus according to claim 5, wherein said measurement device includes a low-pass filter for removing high-frequency components, whose frequencies exceed a predetermined value, from the output signals from said at least three load cells.

8. An optical fiber preform manufacturing apparatus according to claim 7, wherein said predetermined value is 0.5 Hz.

9. An optical fiber preform manufacturing apparatus according to claim 1, wherein each of said load cells includes a rigid member and a strain gauge fixed on a side surface of said rigid member.

10. An optical fiber preform manufacturing apparatus according to claim 1, wherein said at least three load cells are arranged around said rotary support unit.

* * * * *